Sept. 19, 1939.  E. D. LASLEY  2,173,438
GEAR SHIFTING MECHANISM FOR MOTOR VEHICLES
Original Filed Nov. 13, 1936  2 Sheets-Sheet 2
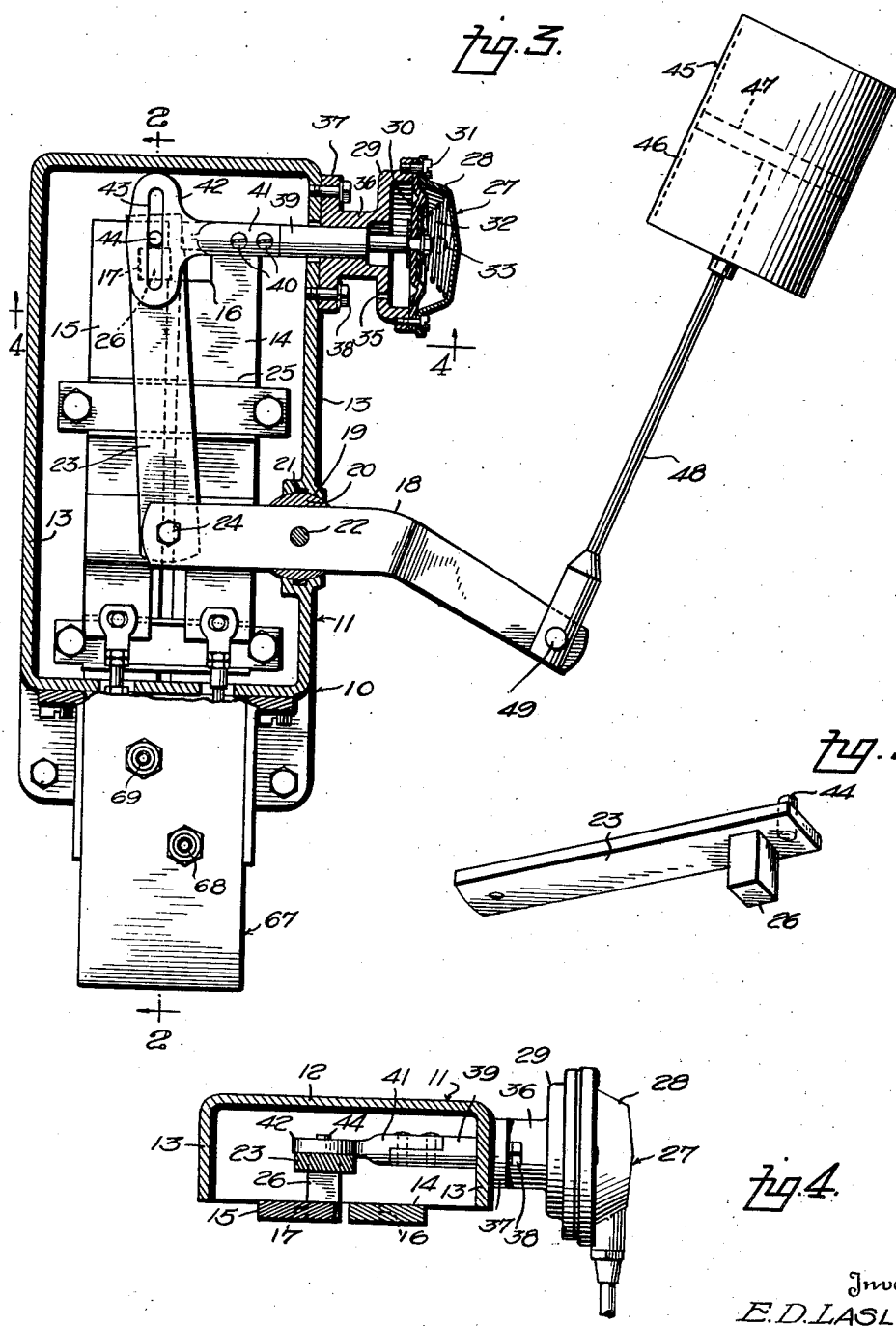
Inventor
E. D. LASLEY Patented Sept. 19, 1939

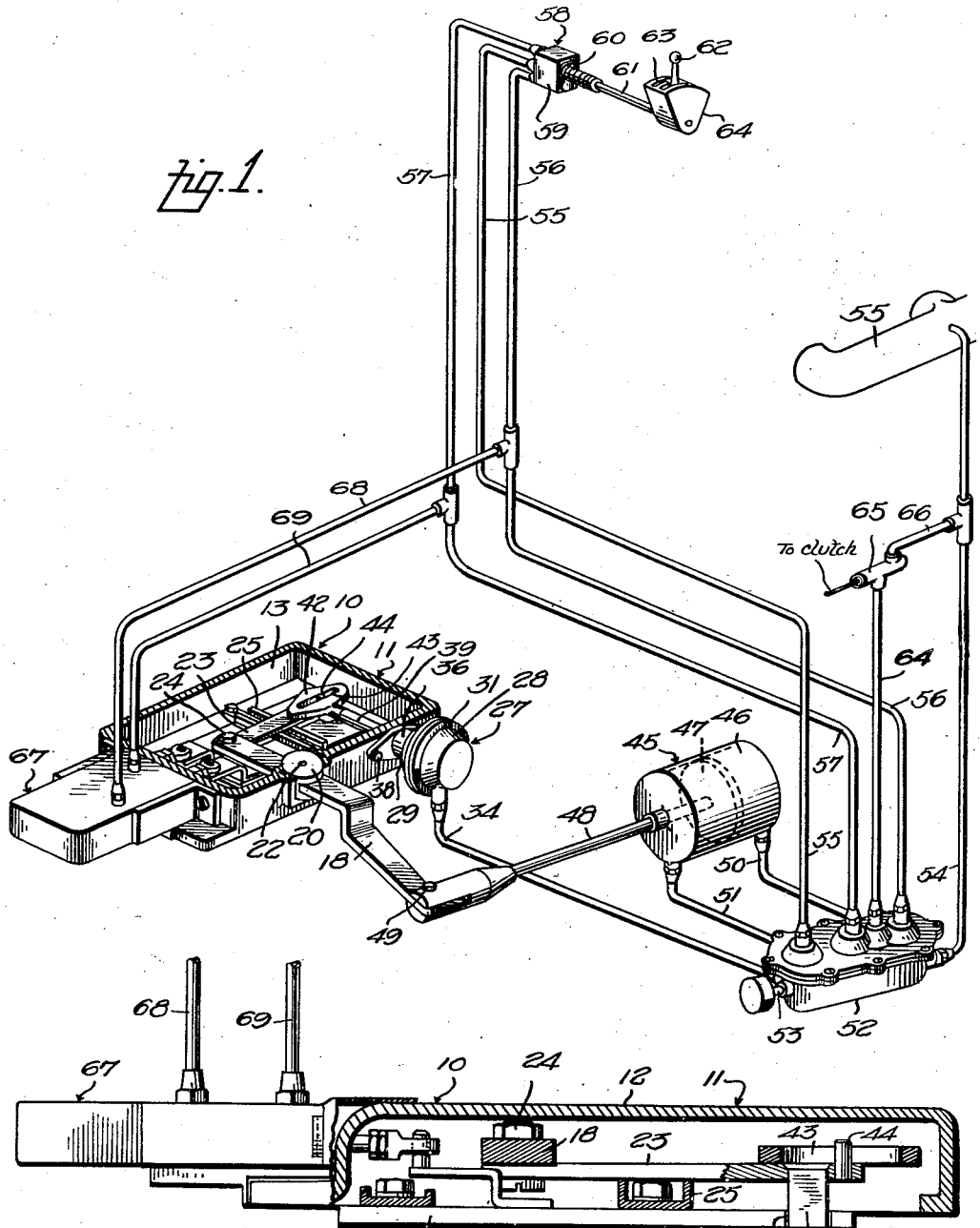

2,173,438

UNITED STATES PATENT OFFICE 2,173,438

GEAR SHIFTING MECHANISM FOR MOTOR VEHICLES

Edward D. Lasley, Detroit, Mich., assignor to Automatic Shifters, Inc., Richmond, Va., a corporation of Virginia Original application November 13, 1936, Serial No. 110,733. Divided and this application January 7, 1937, Serial No. 119,514

6 Claims. (Cl. 74—473)

This invention relates to gear shifting mechanisms for motor vehicles and is a division of my copending application Serial No. 110,733, filed November 13, 1936.

In my copending application referred to I have disclosed a gear shifting mechanism for motor vehicles which is an improvement over the structure of the prior patent of Edward G. Hill and Henry W. Hey, No. 2,030,838. The mechanism of my copending application employs the intake manifold of the motor vehicle engine as the source of pressure different from that of the atmosphere, thereby providing differential pressure for effecting the shifting operations. In order to effect a shifting operation, one end of a shifting motor is connected to the intake manifold and the other end to the atmosphere, and when a gear position is reached, the last mentioned end of the shifting motor is connected to the intake manifold to "vacuum suspend" the piston of the motor. The copending application is particularly directed to a novel valve mechanism for providing the function of "vacuum suspending" the piston of the shifting motor when the apparatus is used with transmissions wherein the shifting rails partake of movement through different distances.

The copending application referred to also discloses novel means for effecting the shifting of the shift rails, and such means forms the subject matter of the present invention, the principal object of which is to provide novel mechanical means for selecting the shift rails for operation and transmitting longitudinal shifting movement to the selected shift rail.

A further object of the invention is to provide a simple device connected to the shifting lever to be actuated thereby and capable of being shifted to select either of the shift rails for actuation.

A further object is to provide a single member forming the mechanical connection for transmitting movement from the shift lever to the shift rails and capable of being laterally moved to select either shift rail for actuation.

A further object is to provide a device of the character referred to wherein the single shifting member is connected at one end to the shift lever and is operatively associated at its opposite end with a crossover device operative for moving the shifting member laterally to select either shift rail for actuation.

A further object is to provide a shifting mechanism which is readily adapted for association solely with the cover plate of the transmission, thus eliminating the necessity for altering any of the transmission elements or the casing thereof, and permitting the apparatus to be employed in connection with a conventional transmission.

Other objects and advantages of the invention will become apparent during the course of the following description.

In the drawings I have shown one embodiment of the invention. In this showing:

Figure 1 is a perspective view of a portion of a motor vehicle gear set showing the shifting mechanism associated therewith, the cover of the gear set being broken away, Figure 2 is a section taken substantially on line 2—2 of Figure 3, parts being shown in section and parts being broken away, Figure 3 is a horizontal sectional view through the cover plate of the transmission and the crossover motor, parts being shown in elevation, Figure 4 is a transverse sectional view on line 4—4 of Figure 3, and, Figure 5 is a detail under side perspective view of the shifting member.

Referring to Figure 1, the numeral 10 designates a motor vehicle transmission as a whole having a cover plate 11 secured thereto. The cover 11 has a top wall 12 and depending side walls 13, the latter of which are secured to the transmission housing. The top wall 12 is cut away in Figure 1 to show the mechanism forming the subject matter of the present invention.

The transmission includes a first and reverse gear shift rail 14 and a second and high gear shift rail 15, these rails being conventional and being longitudinally movable to effect changes in the gear ratios of the transmission. The shift rails 14 and 15 are respectively provided adjacent their forward ends with notches 16 and 17, which register with each other when the gear set is in neutral position. The present invention is adapted to be used with a conventional transmission, and accordingly it will be apparent that the shift rails 14 and 15 partake of their usual longitudinal movements to provide the desired gear ratios.

A shift lever 18 extends through one of the side walls of the cover plate 11, such side wall preferably being provided with a cylindrical recess 19 receiving a cylindrical member 20 adapted to rock in the recess 19 about a vertical axis. The recess 19 is preferably packed as at 21 to prevent the escape of lubricant from the transmission. A pin 22 extends through the lever 18 and through the cylindrical member 20 to fix these elements with respect to each other.

The outer end of the lever 18 is actuated in a manner to be described, and movement of the inner end of the lever is utilized for effecting longitudinal movement of the shift rails. A shift link 23 is pivotally connected at one end as at 24 to the inner end of the lever 18. It will be apparent that the link 23 fits flat against the lower face of the lever 18, as shown in Figure 2, and accordingly is adapted to be supported by the lever 18. If desired, the link 23 may operate across a transverse guide 25 employed in connection with the shift rails 14 and 15. The link 23 extends forwardly of its point of connection with the lever 18 and has its forward end provided with a depending lug 26 corresponding in shape to and selectively engageable in the shift rail notches 16 and 17. It will be apparent that when the shift rails are in neutral position with the notches 16 and 17 in registration with each other, the free end of the shift link 23 may be moved laterally with respect to the transmission to arrange the lug 26 in either of the notches 16 or 17. When either of the shift rails is moved longitudinally away from neutral position, it will be obvious that the lug 26 cannot be moved laterally out of engagement with the shift rail notch in which it is arranged.

A crossover motor indicated as a whole by the numeral 27 is operable for shifting the free end of the link 23 between its two operative positions referred to, that is, with the lug 26 arranged in the respective notches 16 and 17. The crossover motor comprises a pair of casing sections 28 and 29 having a flexible diaphragm 30 clamped therebetween by means of screws or the like 31. A spring 32 arranged in the casing section 28 urges the diaphragm 31 toward the left as viewed in Figure 3. The casing section 28 is provided with a port 33 connected to a pipe 34 by means of which the casing section 28 may be connected to a source of vacuum to be referred to later, to cause the diaphragm 30 to be moved toward the right as viewed in Figure 3, the casing section 29 being vented to the atmosphere as at 35.

A bearing 36 is formed integral with the casing section 29 and is provided with a flange 37 secured to the adjacent side wall 13 as at 38. The bearing 36 slidably supports a shaft 39 having its outer end connected to the diaphragm 30 to be actuated thereby. The inner end of the shaft 39 is connected as at 40 to a shank 41 formed integral with a head 42 which is elongated transversely with respect to the shaft 39 and longitudinally with respect to the transmission. The head 42 is provided with a slot 43 which is likewise elongated longitudinally with respect to the transmission and receives an upwardly extending pin 44 carried by the shift link 23 adjacent the free end thereof. It will be obvious that movement of the diaphragm 30 transmits movement to the free end of the shift link 23 to transfer the lug 26 between the notches 16 and 17, and that the elongated slot 43 permits actuation of the shift link by the lever 18 to effect longitudinal movement of the selected shift rail.

A shift motor 45 forms the source of power for effecting longitudinal movement of the shift rails. This motor comprises a cylinder 46 having a piston 47 reciprocable therein and connected to one end of a piston rod 48. This piston rod extends through one head of the cylinder 46 and has its rear end pivotally connected as at 49 to the outer end of the lever 48. It will be apparent that the cylinder 46 may be suitably supported to partake of slight bodily movement to compensate for the arcuate path of movement of the pivot pin 49. The forward and rear ends of the cylinder 46 are connected to pipes 50 and 51 respectively, by means of which the ends of the cylinder 46 may communicate with the source of vacuum and the atmosphere to control the operation of the piston 47.

The pipes 34, 50 and 51 lead to a suitable main valve mechanism 52 which may be of the general type shown in prior Patent No. 2,030,838 referred to above. Such valve mechanism is provided with an air pipe 53 and with a vacuum pipe 54 leading to the intake manifold 55 of the vehicle engine. A valve is provided in the mechanism 52 for each of the pipes 34, 50 and 51 to control communication between such pipes and the pipes 53 and 54. Such valves are fluid pressure operated and the fluid pressure for operating such valves is controlled by means of pipes 55, 56 and 57, which lead to a selector valve mechanism indicated as a whole by the numeral 58.

The selector valve mechanism comprises a valve body 59 having a pair of passages therethrough communicating with the respective pipes 56 and 57 and adapted to be selectively connected to the atmosphere upon the rocking of a manually controlled valve 60. This valve is splined on a shaft 61 which is axially slidable to the left as viewed in Figure 1 to open communication between the pipe 55 and the atmosphere. The shaft 61 is adapted to be rocked and axially moved by means of a selector handle 62 operating in an H-slot 63 formed in the upper arcuate face of a suitable housing 64. It will be apparent that the selector handle 62 is movable in the H-slot 63 to simulate the movement of a conventional gear shift lever, and movement of the handle 62 to the four operative positions of the H-slot 63 provides gear ratios in accordance with the corresponding movement of a conventional gear shift lever.

Each of the valves of the mechanism 52 has its fluid pressure operating means normally subjected to the action of a vacuum leakage to effect movement of the valves in one direction, the respective pipes 55, 56 and 57, when opened to the atmosphere, overcoming the vacuum leakage to release the respective valves of the mechanism 52 for movement in the opposite direction. The vacuum leakage for the valves associated with the pipes 55 and 56 is provided through a pipe 64 connected to a valve housing 65 from which a pipe 66 leads to the vacuum pipe 54. A valve (not shown) in the housing 65 is connected to the vehicle clutch to open the pipe 64 to the atmosphere when the clutch is disengaged, thus preventing the pipes 56 and 57 from controlling their associated valves to prevent a shifting operation when the clutch is in engagement. When the clutch is disengaged, the normal vacuum leakage is established between the pipes 64 and 66, thus rendering the selector valve mechanism effective for controlling the valves in the mechanism 52 which determine the connection of the pipes 50 and 51 to the atmosphere and to the intake manifold.

A valve mechanism indicated as a whole by the numeral 67 is associated with one end of the cover of the gear set, and pipes 68 and 69 connect the valve mechanism 67 to the respective pipes 56 and 57. The purpose of the mechanism 67 is to cause the motor 45 to move the gears to a neutral position and stop in such position when the selector handle 62 is moved to neutral position, the valve mechanism 67 serving the additional function of cooperating with the selector valve mechanism to vacuum suspend the piston 47 in any gear position when it reaches such position. The valve mechanism 67 forms the subject matter of my copending application Serial No. 110,733, referred to above.

The operation of the apparatus is as follows:

Assuming that the gear set is in neutral position, the notches 16 and 17 will be arranged in registration with each other and the spring 32 of the crossover motor will bias the shaft 39 toward the left, and accordingly the parts will occupy the relative positions shown in Figure 2 with the lug 26 in engagement with the second and high gear shift rail 15. If the operator desires to shift into low gear, he will move the selector handle 62 to the left and rearwardly in the slot 63. This movement slides the shaft 61 axially toward the left as viewed in Figure 1 to open the pipe 55 to the atmosphere, and rocks the valve 60 in a counter-clockwise direction to open the pipe 57 to the atmosphere while maintaining the pipe 56 closed.

In accordance with the disclosure in my copending application referred to and the disclosure of prior Patent No. 2,030,838, the operation referred to controls the valves in the mechanism 52 to maintain the pipe 50 connected to the atmosphere and to connect the pipes 34 and 51 to the intake manifold. The opening of the pipe 34 to the intake manifold connects the crossover motor casing 28 to the source of vacuum, in which case air pressure in the casing 29 moves the diaphragm 30 toward the right as viewed in Figure 3. This movement is transmitted to the shaft 39, and accordingly the pin 44 will be shifted toward the right as viewed in Figure 3 to transfer the lug 26 from the notch 17 to the notch 16, thus selecting the first and reverse gear shift rail 14 for operation.

The operation of the selector handle 62 referred to above likewise connects the pipe 51 to the source of vacuum, as stated, and atmospheric pressure admitted into the cylinder 46 through the pipe 50 moves the piston 47 rearwardly, it being understood that the perspective view in Figure 1 is taken looking toward the forward end of the vehicle. Rearward movement of the piston 47 swings the lever 18 about its pivot axis, and accordingly the inner end of the lever 18 swings forwardly to transmit similar movement to the shift ling 23. This link having been previously moved to select the shift rail 14 for operation, it will be apparent that the rocking of the lever 18 will move the shift rail 14 forwardly to place the gear set in low gear.

After the vehicle has gained sufficient momentum in low gear in accordance with conventional operation of the clutch and accelerator pedal, the clutch may be released, whereupon the selector handle 62 may be moved to the forward and right hand end of the H-slot 63 to place the gear set in second gear. The forward movement of the handle 62 reverses the position of the valve 60, this valve being rocked in a clockwise direction to close the pipe 57 and open the pipe 56 to the atmosphere. Under such conditions, the valves which control the pipes 50 and 51 will assume positions in which the pipe 50 will be connected to the intake manifold and the pipe 51 to the atmosphere, whereupon the piston 47 will move forwardly.

When the handle 62 is moved to the right in its movement to second gear position, the shaft 61 will be moved longitudinally to close the pipe 55 to the atmosphere, whereupon the pipe 34 will be disconnected from the intake manifold and connected to the atmosphere. Atmospheric pressure thus will be established on both sides of the diaphragm 30 of the crossover motor, and the spring 32 will urge the shaft 39 toward the left as viewed in Figure 3. The lug 26 cannot be transferred from the notch 16 to the notch 17 by the action of the spring 32, however, until the parts reach neutral position. When the piston 32 in its forward movement brings the shift rail 14 to neutral position, the spring 32 will immediately transfer the lug 26 from the notch 16 to the notch 17, whereupon the remainder of the forward movement of the piston 47 will operate, through the shift link 23, to transmit rearward sliding movement to the shift rail 15, thus placing the gear set in second gear position.

The shift into high gear may be made, when desired, merely by moving the handle 62 rearwardly in the right hand side of the slot 63. This movement does not slide the shaft 61, and accordingly the crossover motor casing 28 will remain in communication with the atmosphere throughout the shifting movement from second gear into high gear and accordingly the lug 26 will remain in engagement with the notch 17. However, the rocking of the valve 60 in a counter-clockwise direction upon movement of the handle 62 to high gear position opens the pipe 57 and closes the pipe 56 to the atmosphere, whereupon the motor 45 will be controlled in the same manner as for low gear, the piston 47 moving to a point adjacent the rear end of the cylinder 46. However, throughout such movement, the piston 47 will actuate the high and reverse gear shift rail 15, this rail being moved forwardly to effect the shift into high gear.

The shift into reverse gear will be apparent from the foregoing description, the handle 62 being moved to the left and forwardly to actuate the motor 45 in the same manner as for second gear. However, the crossover motor will be actuated in the same manner as for low gear, and the forward end of the shift link 23 will be shifted at neutral position to select the shift rail 14 for operation, such shift rail being moved rearwardly to provide reverse gear.

It will be apparent from the disclosure of my copending application Serial No. 110,733 that the valve mechanism 67 functions to cause the gears to be moved to neutral position and to stop in such position when the selector handle 62 is moved to and permitted to remain in neutral position. It also will be apparent from my copending application that the valve mechanism 67 functions when the piston 47 reaches a gear position to connect to the intake manifold the end of the cylinder 46 which has been connected to the atmosphere during the shifting operation.

The mechanical parts for selecting and effecting movement of the shift rails are preferably employed in connection with a mechanism of the type disclosed in my copending application and in prior Patent No. 2,030,838, referred to above. Such mechanism has been found to be particularly quick and efficient in operation, but it will be apparent that the mechanical selecting and shifting parts may be employed with shifting mechanisms of other types. The shift link 23 provides an extremely simple and efficient device for permitting either of the shift rails to be selected for operation and for actuating the selected shift rail upon actuation of the shift lever. Moreover, it will be apparent that the use of the shift link 23 facilitates the placing of the crossover motor shaft, the lever 18 and the link 23 in horizontal positions within extremely narrow vertical limits, thus facilitating the carrying of these parts by the transmission cover plate. Thus it is unnecessary to alter the casing of the conventional transmission, and the installation of the mechanism is rendered simple and economical. The shift link 23 has its free end readily shiftable by the crossover motor to select either of the shift rails for operation, and the slight angular position of the shift link with respect to either selected shift rail permits the transmission of the shifting movement almost in direct alignment with the selected shift rail, thus reducing friction to a minimum.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle transmission having parallel shifting elements selectively movable in opposite directions from a neutral position into different transmission setting positions, comprising a shift lever pivotally supported for swinging movement in a horizontal plane, actuating means pivotally connected to said shift lever for movement in a horizontal plane, said means having a lug selectively engageable with said shifting elements, and a single crossover device having a horizontally movable member connected to said means to move the lug thereof into selective engagement with said shifting elements to actuate them upon movement of said shift lever.

2. A gear shifting mechanism for a motor vehicle transmission having parallel shifting elements selectively movable in opposite directions from a neutral position into different transmission setting positions, comprising a shift lever extending transversely with respect to said shifting elements and pivoted for swinging movement in a horizontal plane, a shift link pivotally connected at one end to said shift lever for swinging movement in a horizontal plane and provided adjacent its free end with a lug, and a cross-over device having a horizontally movable member connected to said shift link at a point spaced from the pivotal connection thereof for moving said lug selectively into engagement with said shifting elements to actuate them upon movement of said shift lever.

3. A gear shifting mechanism for a motor vehicle transmission having parallel selectively movable shifting elements, comprising a shift lever extending transversely with respect to said shifting elements and pivoted for swinging movement in a horizontal plane, a shift link pivotally connected at one end to said shift lever for swinging movement in a horizontal plane and provided adjacent its free end with a lug, and a crossover device including a horizontal axially movable shaft having a slot elongated in the direction of movement of said shifting elements, said shift link having a pin engageable in said slot whereby axial movement of said shaft swings said lug selectively into engagement with said shifting elements to actuate them upon movement of said shift lever.

4. A gear shifting mechanism for a motor vehicle transmission having shifting elements selectively movable in opposite directions from a neutral position into different transmission setting positions, comprising a shift member, actuating means pivotally connected to said shift member and having a portion selectively engageable with said shifting elements, and a single selectively operable crossover device having a movable member connected to said actuating means to swing it about its pivotal connection to move said portion of said actuating means selectively into engagement with said shifting elements for actuating them upon movement of said shift member, said crossover device having means biasing said movable member in one direction to tend to maintain said portion of said actuating means in engagement with one of said shifting elements.

5. A gear shifting mechanism for a motor vehicle transmission having parallel shifting elements selectively movable in opposite directions from a neutral position into different transmission setting positions, comprising a shift member, a shift link pivotally connected adjacent one end to said shift member and having a portion adjacent its opposite end selectively engageable with said shifting elements, and a single selectively operable crossover device having a member movable in a horizontal plane and connected to said shift link adjacent its last named end to move said portion of said shift link into selective engagement with said shifting elements to actuate them upon movement of said shift member, said crossover device having means associated therewith for biasing said movable member in one direction to tend to maintain said portion of said shift link in engagement with one of said shifting elements.

6. A gear shifting mechanism for a motor vehicle transmission having parallel shifting elements selectively movable in opposite directions from a neutral position into different transmission setting positions, comprising a shift lever pivotally supported intermediate its ends for swinging movement, an actuating link pivotally connected at one end to one end of said lever and having a portion adjacent its other end selectively engageable with said shifting elements, and a single selectively operable crossover device having a movable member connected to said link adjacent its last named end to move said portion thereof into selective engagement with said shifting elements to actuate them upon movement of said shift lever, said crossover device having means biasing said movable member in one direction to tend to maintain said portion of said link in engagement with one of said shifting elements.

EDWARD D. LASLEY.